United States Patent [19]

Statz

[11] Patent Number: 4,678,350

[45] Date of Patent: Jul. 7, 1987

[54] BEARING ASSEMBLY

[76] Inventor: Robert G. Statz, 2478 N. 66th St., Wauwatosa, Wis. 53213

[21] Appl. No.: 869,256

[22] Filed: Jun. 2, 1986

[51] Int. Cl.$^4$ .......................... F16C 23/04; F16C 25/04
[52] U.S. Cl. ...................................... 384/208; 384/192; 384/207
[58] Field of Search .......................... 384/192, 206–210, 384/495–498

[56] References Cited

U.S. PATENT DOCUMENTS 3,438,661  4/1969  Bowen, III .
3,614,182  10/1971  Rozentals .
3,746,408  7/1973  Wachter et al. .

FOREIGN PATENT DOCUMENTS 99240  12/1959  Denmark .
2332195  1/1974  Fed. Rep. of Germany ...... 384/206

Primary Examiner—Stuart S. Levy
Assistant Examiner—Thomas R. Hannon
Attorney, Agent, or Firm—Fuller, Puerner & Hohenfeldt

[57] ABSTRACT

A bearing assembly comprising a first half including a first head portion partially defining a socket, a first shank portion connected to the first head portion, and a first periphery having extending therefrom a plurality of spaced first projections, and a second half substantially identical to the first half and including a second head portion aligned with the first head portion to define the socket, a second shank portion connected to the second head portion and aligned with the first shank portion, and a second periphery having extending therefrom a plurality of spaced second projections, the first projections being folded over the second periphery and the second projections being folded over the first periphery in alternating relationship so that the first and second projections interlock the halves and align the halves with respect to each other.

18 Claims, 5 Drawing Figures

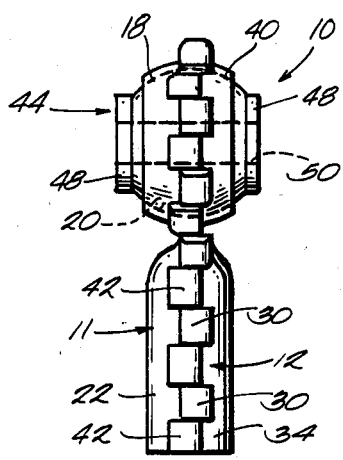
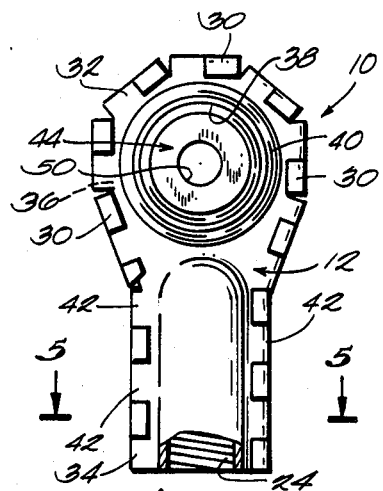
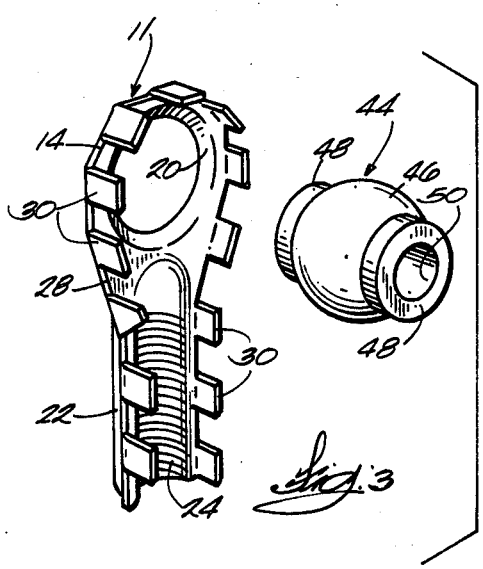
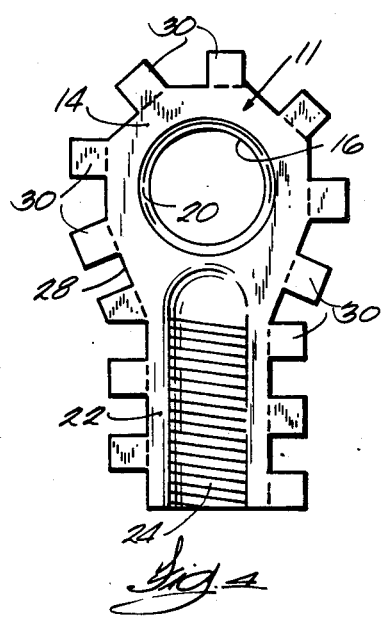
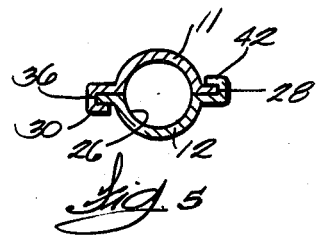

BEARING ASSEMBLY

BACKGROUND OF THE INVENTION

The invention relates to bearing assemblies, and, more particularly, to spherical bearing assemblies or ball joint assemblies.

Conventional ball joint assemblies include a head portion defining a spherical socket and a shank portion connected to the head portion and defining an internally threaded bore. The socket receives a spherical bearing member, and the bore receives an externally threaded shank member.

It is known in the art to construct a bearing assembly from two stamped halves. See, for example, U.S. Pat. No. 3,746,408, issued July 17, 1973 to Wachter. Typically, the halves are secured together by crimping the periphery of one about the periphery of the other.

It is also known to form the threads in the bore either by tapping or roll forming. Both of these methods require an additional process beyond the stamping process in which the halves are formed. Furthermore, tapping leaves pieces of cut metal which must be removed from the bore.

Attention is also directed to U.S. Pat. No. 3,614,182, issued Oct. 19, 1971, to Rozentals, U.S. Pat. No. 3,438,661, issued Apr. 15, 1969, to Bowen, and Danish Patent No. 99,240, issued Dec. 23, 1959.

SUMMARY OF THE INVENTION

The invention provides a bearing assembly made from identical stamped halves. The use of identical halves significantly reduces the cost of manufacturing the bearing assembly.

In the preferred embodiment, each half includes an eight-sided head portion partially defining a socket, a shank portion connected to the head portion and having a threaded, semi-cylindrical inner surface partially defining a threaded bore, and a periphery having extending therefrom a plurality of spaced projections.

The halves are secured to each other by folding the projections of each half over the periphery of the other half in alternating relationship, rather than by crimping the entire periphery of one half about the periphery of the other half. The alternating projections provide a stronger connection and also more accurately align the two halves.

The invention also provides a method for making a bearing assembly, the method comprising the steps of:

(1) providing first and second sheets of metal;

(2) stamping both sheets to form halves including a head portion partially defining a socket, a shank portion connected to the head portion and having a threaded, semi-cylindrical inner surface, and a periphery having extending therefrom a plurality of spaced projections;

(3) aligning the halves with the head portions defining the socket and with the shank portions forming an internally threaded bore; and (4) interlocking the halves by folding the projections of each half over the periphery of the other half in alternating relationship so that the projections maintain the alignment of the halves.

The advantage of this method is that the threads are formed in the same stamping process in which the halves are formed, instead of after the halves are connected. Thus, an additional tapping or roll forming process is not required, and there are no cuttings to clean out of the bore. This further reduces manufacturing costs. Furthermore, the stamped threads are stronger than tapped threads.

Other features and advantages of the invention will become apparent to those skilled in the art upon review of the following detailed description, claims and drawings.

DESCRIPTION OF THE DRAWINGS

FIG. 1 is a front view, partially cut away, of a bearing assembly embodying the invention.

FIG. 2 is a side view of the bearing assembly.

FIG. 3 is an exploded, perspective view of one of the stamped halves and the spherical bearing member.

FIG. 4 is an inside view of one of the stamped halves.

FIG. 5 is a cross-sectional view taken along line 5—5 in FIG. 1.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A bearing assembly 10 embodying the invention is illustrated in the drawings. The bearing assembly 10 comprises substantially identical first and second halves 11 and 12, respectively. Preferably, the two halves 11 and 12 are stamped and are formed in identical stamping processes.

As best shown in FIG. 4, the first half 11 includes a first head portion 14 partially defining a socket. In the preferred embodiment, the first head portion 14 is polygonal, and more particularly octagonal or eight-sided. Furthermore, in the preferred embodiment, the first head portion 14 includes a circular opening 16 which partially defines the socket. In the illustrated construction, as shown in FIGS. 2 and 3, the first head portion 14 includes an annular, outwardly extending flange portion 18 surrounding the circular opening 16. The inner surface 20 of the flange portion 18 forms a portion of a sphere and further defines the socket.

The first half 11 also includes a first shank portion 22 connected to the first head portion 14. In the preferred embodiment, the first shank portion 22 is connected to one of the sides of the first head portion 14. The first shank portion 22 has a threaded, semi-cylindrical inner surface 24 which partially defines an internally threaded bore 26 (see FIG. 5) adapted to receive an externally threaded shank member (not shown).

The first half 11 also includes a first periphery 28 having extending therefrom a plurality of spaced first tabs or projections 30. As shown in FIG. 4, in the preferred embodiment, each of the seven sides of the first head portion 14 other than the side (the lower side in FIG. 4) to which the first shank portion 22 is connected has at least one of the first projections 30 extending therefrom. More particularly, in the illustrated construction, each of the five sides which form the outer end of the first head portion 14 has one of the first projections 30 extending therefrom. It should be noted that, in FIG. 4, the tabs or projections 30 are shown extending sidewardly from the periphery 28. In FIG. 3, the tabs 30 are shown extending inwardly.

As shown in FIG. 4, the tabs 30 define spaces between adjacent tabs 30, and each of the tabs 30 has a width (i.e., a dimension extending along the periphery 28) which is substantially equal to the width of the opposing space. In other words, if the first half 11 were "folded" along its vertical center line, each tab 30 would fit into the space on the other side of the half 11 and would fit snugly between the tabs 30 defining that space.

As mentioned above, the second half 12 is identical to the first half 11. Thus, the second half 12 includes a second head portion 32, a second shank portion 34, and a second periphery 36. The second head portion 32 is identical to the first head portion 14, the second shank portion 34 is identical to the first shank portion 22, and the second periphery 36 is identical to the first periphery 28. The second head portion 32 includes a circular opening 38 (FIG. 1) and a flange portion 40, both of which further define the socket. The second periphery 36 has second tabs or projections 42 extending therefrom.

The first and second halves 11 and 12 are secured to each other with the inner surfaces of the two halves facing each other so that the first and second shank portions 22 and 34 form the above-mentioned internally threaded bore 26, and so that the circular openings 16 and 38 and outwardly extending flange portions 18 and 40 define the socket. The first projections 30 are folded over the second periphery 36 and the second projections 42 are folded over the first periphery 28 in alternating relationship so that the first and second projections 30 and 42 interlock the halves 11 and 12 and accurately align the halves with respect to each other. This is best shown in FIGS. 1, 2 and 5. Because the first and second halves 11 and 12 are identical, and because of the above-described relationship between the projections or tabs and the opposing spaces, the projections 30 fit snugly between the projections 42 and vice versa, as shown in FIG. 2. It is this snug fit between adjacent tabs 30 and 42 that provides the accurate alignment of the halves 11 and 12.

The alternating and interlocking projections provide a stronger connection and better alignment than are obtainable with the prior art method of crimping the entire periphery of one half about the periphery of the other half. In fact, this superior alignment makes it possible to separately form the threads in each half rather than forming the threads after the two halves are connected.

The bearing assembly 10 also comprises (see FIG. 3) a bearing member 44 pivotally received in the socket. In the preferred embodiment, the bearing member 44 includes a generally spherical body 46, and opposed projecting portions 48 each extending through a respective one of the circular openings 16 and 38 in the head portions of the halves. The bearing member 44 also includes a generally cylindrical passage 50 extending through the projecting portions 48 and the body 46. The passage 50 is adapted to slidably and rotatably receive a rod (not shown) for connecting the rod to the above-mentioned shank member.

Preferably, the first and second halves 11 and 12 are made according to the method of the invention. According to this method, the two halves 11 and 12 are formed separately in identical stamping processes and then are secured to each other with the bearing member 44 received between them in the socket.

More particularly, the method comprises the steps of forming the first half 11, and forming the second half 12. Preferably, the halves are formed by an identical stamping process, and, more particularly, a progressive die stamping process. During this stamping process, the first and second halves 11 and 12 are completely formed, i.e., each is formed with a head portion, a shank portion having a threaded, semi-cylindrical inner surface, and a periphery having extending therefrom a plurality of spaced projections. When the process is completed, the halves 11 and 12 are formed as shown in FIG. 3, i.e. with the tabs bent inwardly.

The method also comprises the step of aligning the first and second halves 11 and 12 with the head portions 14 and 32 defining the socket and with the shank portions 22 and 34 forming the internally threaded bore 26. The method further comprises the steps of placing the bearing member 44 in the socket, and interlocking the first and second halves 11 and 12 by folding the first projections 30 over the second periphery 36 and folding the second projections 42 over the first periphery 28, in alternating relationship with the first projections 30, so that the projections 30 and 42 maintain the alignment of the halves 11 and 12 with respect to each other. The folding of the projections is best shown in FIGS. 1, 2 and 5.

Various features and advantages of the invention are set forth in the following claims.

I claim:

1. A bearing assembly comprising
   a first half including a first head portion partially defining a socket, a first shank portion connected to said first head portion, and a first periphery having extending therefrom a plurality of spaced first projections, and
   a second half substantially identical to said first half and including a second head portion aligned with said first head portion to define said socket, a second shank portion connected to said second head portion and aligned with said first shank portion, and a second periphery having extending therefrom a plurality of spaced second projections,
   said first projections being folded over said second periphery and said second projections being folded over said first periphery in alternating relationship so that said first and second projections interlock said halves and align said halves with respect to each other.

2. An assembly as set forth in claim 1 where each of said shank portions has a threaded, semi-cylindrical inner surface so that said shank portions form an internally threaded bore adapted to receive an externally threaded member.

3. An assembly as set forth in claim 1 and further comprising a bearing member pivotally received in said socket.

4. An assembly as set forth in claim 3 wherein said head portions have aligned circular openings defining said socket.

5. An assembly as set forth in claim 4 wherein said bearing member includes a generally spherical body, and opposed projecting portions each extending through a respective one of said openings.

6. An assembly as set forth in claim 5 wherein said bearing member includes a generally cylindrical passage extending through said projecting portions and said body.

7. An assembly as set forth in claim 1 wherein each of said head portions is polygonal.

8. An assembly as set forth in claim 7 wherein each of said head portions has eight sides with the associated shank portion being connected to one of said sides.

9. An assembly as set forth in claim 8 wherein each of the other seven sides of each of said head portions has at least one of the associated projections extending therefrom.

10. An assembly as set forth in claim 1 wherein each of said halves is stamped from a sheet of metal.

11. An assembly as set forth in claim 10 wherein each of said shank portions has a threaded inner surface so that said shank portions form an internally threaded bore adapted to receive an externally threaded member.

12. A bearing assembly comprising
 a first half including a first eight-sided head portion partially defining a socket, a first shank portion connected to said first head portion and having a threaded, semi-cylindrical inner surface, and a first periphery having extending therefrom a plurality of spaced first projections, and
 a second half substantially identical to said first half and including a second eight-sided head portion aligned with said first head portion to define said socket, a second shank portion connected to said second head portion and aligned with said first shank portion, said second shank portion having a threaded, semi-cylindrical inner surface so that said shank portions form an internally threaded bore, and a second periphery having extending therefrom a plurality of spaced second projections,
 said first projections being folded over said second periphery and said second projections being folded over said first periphery in alternating relationship so that said first and second projections interlock said halves and align said halves with respect to each other.

13. An assembly as set forth in claim 12 and further comprising a bearing member pivotally received in said socket.

14. An assembly as set forth in claim 13 wherein each of said head portions have aligned circular openings defining said socket.

15. An assembly as set forth in claim 14 wherein said bearing member includes a generally spherical body, and opposed projecting portions each extending through a respective one of said apertures.

16. An assembly as set forth in claim 15 wherein said bearing member includes a generally cylindrical passage extending through said projecting portions of said body.

17. An assembly as set forth in claim 12 wherein each of the other seven sides of each of said head portions has at least one of the associated projections extending therefrom.

18. An assembly as set forth in claim 12 wherein each of said halves is stamped from a sheet of metal.

* * * * *